Patented Aug. 31, 1943

2,328,505

UNITED STATES PATENT OFFICE 2,328,505

ALKANOL AMINE SALTS OF DINITRO-PHENOLS

Frank B. Smith and John N. Hansen, Midland, Mich., assignors to The Dow Chemical Company, Midland, Mich., a corporation of Michigan No Drawing. Application March 14, 1941, Serial No. 383,348

8 Claims. (Cl. 260—584)

This invention relates to amine salts of dinitrophenols and to parasiticidal compositions in which they are employed as active toxicants. The invention is particularly concerned with alkanol amine salts of dinitro-phenols having the formula

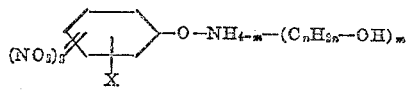

wherein X represents a methyl radical or hydrogen, $m$ is an integer from 1 to 3, inclusive, and $n$ is an integer greater than 1. We have prepared representative members of this group of compounds and found them to be high-melting crystalline solids, readily soluble in both water and common organic solvents. These compounds are relatively stable to light and air and not appreciably affected by carbon dioxide. They are valuable as parasiticides.

While the invention is directed to the class of compounds described above, a preferred group of alkanol amine salts is defined by the following formula

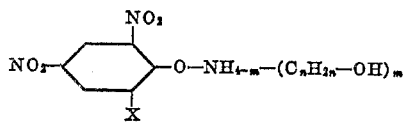

wherein X represents a methyl radical or hydrogen, $m$ is an integer from 1 to 3, inclusive, and $n$ is an integer greater than 1.

The foregoing compounds may be prepared by reacting a suitable alkanol amine, such as monoethanol amine, triethanol amine, tripropanol amine, monoisopropanol amine, tributanol amine, and the like, with a dinitro-phenol or dinitro-cresol. The reaction is conveniently carried out in benzene, alcohol, or the like. Substantially equimolecular proportions of the amine and phenol have been found to give the desired salts in good yield, although any suitable amounts may be employed. The operating temperatures are not critical. Reduced amounts of solvent are required at temperatures above 40° C., but the reaction may be conveniently carried out at any desired temperature up to the boiling temperature of the reaction mixture. In operation, the phenol is dissolved in the selected solvent and the amine then added thereto. To insure the formation of a relatively homogeneous product and to minimize occlusion of reactants by portions of the product crystallizing out of solution during the addition of the amine, the amine is preferably added portion-wise with stirring over a short period of time. Following the completion of the reaction, the mixture is cooled and filtered or otherwise manipulated to separate out the alkanol amine salt product. This product may be further purified by washing with small amounts of cold ethanol or by recrystallization from methanol, ethanol, or similar solvent. The amine salt obtained from the filtration, washing, or recrystallizing procedures is then air-dried at a temperature calculated to volatilize residual traces of solvent.

An alternate method of preparation consists of heating the alkanol amine and dinitro-phenol or dinitro-cresol to a fusion temperature at which the reactants are entirely miscible, one with the other. After thorough mixing, the reaction product is cooled to below its melting temperature and the crude product thereafter taken up in hot alcohol and recrystallized to remove any traces of excess and unreacted amine or phenol present therein.

The following examples set forth certain embodiments of the invention but are not to be construed as limiting the same:

*Example 1*

18.4 grams (0.1 mol) of 2.4-dinitro-phenol was dissolved in 50 milliliters of ethanol. 14.9 grams (0.1 mol) of triethanol amine was then added portion-wise to the phenol solution with stirring. Appreciable heat of reaction was developed and the alcoholic solution turned dark red. The mixture was then cooled to below room temperature, whereby lemon-yellow crystals of the triethanol amine addition salt of 2.4-dinitro-phenol precipitated from solution. The amine salt product was separated by filtration, washed with cold ethanol and dried at 70° C., whereby there was obtained 25.5 grams of a substantially pure product, melting at 118.5°–120.5° C. and having a solubility of 84 grams in 100 grams of water at 25° C.

*Example 2*

39.6 grams (0.2 mol) of 2.4-dinitro-6-methyl-phenol (dinitro-ortho-cresol) was dissolved in 100 milliliters of ethanol and 12.2 grams (0.2 mol) of monoethanol amine reacted therewith, substantially as described in Example 1. Upon cooling of the reaction mixture and filtration, there was obtained 48.5 grams of monoethanol amine salt of 2.4-dinitro-6-methyl-phenol as a yellow crystalline compound melting at 152.5°–

153° C. and having a solubility of 19.05 grams in 100 grams of water at 25° C.

Example 3

Similarly, 39.6 grams (0.2 mol) of 2.4-dinitro-6-methyl-phenol and 21 grams (0.2 mol) of diethanol amine were reacted together in 100 milliliters of alcohol substantially as described above. As a product from this reaction there was obtained 57.5 grams of diethanol amine salt of 2.4-dinitro-6-methyl-phenol as a yellow crystalline compound melting at 136°–137.5° C., and soluble to the extent of 23.4 grams in 100 grams of water at 25° C.

Example 4

39.6 grams (0.2 mol) of 2.4-dinitro-6-methyl-phenol and 29.8 grams (0.2 mol) of triethanol amine were mixed together and heated to 120° C. with stirring. The reaction mixture was then cooled, whereupon the product solidified. This solid product was dissolved in 200 milliliters of hot methanol and thereafter cooled and filtered to obtain a crude amine salt product. The crude product was recrystallized from ethanol, whereby there was obtained 52 grams of the triethanol amine salt of 2.4-dinitro-6-methyl-phenol as a yellow crystalline compound, melting at 121°–124° C., and soluble to the extent of 35.5 grams in 100 grams of water at 25° C.

By substituting other alkanol amines for those set forth in the examples, the corresponding salts of monopropanol amine, dipropanol amine, tripropanol amine, monoisopropanol amine, diisopropanol amine, triisopropanol amine, monobutanol amine, dibutanol amine, tributanol amine, etc. may be obtained. Similarly, 2.6-dinitrophenol, 2.5-dinitrophenol, 2.6-dinitro-4-methyl-phenol, 2.4-dinitro-5-methyl-phenol, and the like may be substituted for the phenolic reactants shown in the examples.

Many synthetic organic compounds have been suggested as parasiticides and, more particularly, as substitutes for lead, arsenic, and copper-containing inorganic compounds. Frequently such synthetic derivatives are injurious to plants so that their use must be carefully controlled. Other difficulties are encountered with organic toxicants in compounding to form concentrates and in the provision of suitable dispersions so as to obtain maximum coverage and optimum control of plant parasites. A further problem has resided in the provision of wetting and dispersing agents compatible with synthetic organic toxicants.

According to the present invention the addition salts of the alkanol amines with the dinitro-phenols and dinitro-cresols are employed as parasiticidal toxicants. We have found that compositions comprising these products may be applied to growing plants in dormant applications without material injury thereto. It has further been found that these compounds do not require the use of additional wetting or dispersing agents to accomplish a satisfactory contacting of the parasite and of waxy or water-repellent plant surfaces. The relatively high solubility of these alkanol amine salts makes it possible to prepare aqueous solutions of high concentration adapted to be employed as parasite concentrates for later compounding into dilute spray compositions. In this respect the alkanol amine salts of dinitro-phenols and of dinitro-cresols have been found clearly to distinguish over the corresponding amine salts of higher alkyl-substituted dinitro-phenols which are frequently of very low solubility in water and other solvent materials commonly employed in spray compositions.

The new compounds may be employed as substituents of dusts but are preferably used in the form of aqueous sprays. The alkanol amine salts as described above may be compounded with carriers such as diatomaceous earth, bentonite, talc, sulfur, wood flours, inorganic phosphates, and lime, to form agricultural dusting compositions. If desired, such dusts may be employed as concentrates and diluted with or suspended in water or other inert liquid carrier to form sprays. The alkanol amine addition salts may also be incorporated with various wetting, dispersing, and sticking agents and subsequently diluted to produce either dust or spray compositions in which the amine salt is present in any desired concentration. In the preparation of concentrates, from about 5 to about 80 per cent by weight of the alkanol amine addition salt is commonly employed. The preferred concentration employed in spray or dust compositions for application to living plants is between about 0.01 and 5 per cent by weight. The particular adaptation in which the amine salt is employed and the concentration thereof in the final composition are dependent upon the type of insect or other parasite to be controlled and the circumstances under which such control is to be accomplished.

The alkanol amine salts are generally employed in aqueous sprays with or without oil or additional emulsifying, wetting, or dispersing agent. They may also be incorporated in other standard type insecticidal and fungicidal compositions, either as the sole toxic ingredient of such composition or in combination with such materials as inorganic pigments, organic dyes, pyrethrum, cryolite, rotenone, organic thiocyanates, sulfur, copper sprays, and related parasiticidal toxicants.

The following example illustrates one way in which the invention may be employed as a parasiticidal toxicant:

Example 5

20 parts by weight of a partially-neutralized sulfonated sperm oil and 80 parts by weight of light lubricating oil were mixed together to form an oil base which in 3 per cent aqueous emulsion gave a control of 32.9 per cent against eggs of the milkweed bug (*Lygaeus kalmii* Stal.). Varying amounts of the alkanol amine salts of dinitro-phenol and dinitro-cresol were added to the aqueous oil dispersion to obtain compositions exercising a greatly increased ovicidal control. Representative results were obtained with the monoethanol amine salt of 2.4-dinitro-6-methyl-phenol in the amount of 1 pound per 100 gallons of oil spray, the diethanol amine salt of 2.4-dinitro-6-methyl-phenol in the amount of 1 pound per 100 gallons of oil spray, and the triethanol amine salt of 2.4-dinitro-6-methyl-phenol at 0.5 pound per 100 gallons of oil spray. These compositions gave kills of 84 per cent, 92 per cent, and 80 per cent, respectively.

Other modes of applying the principle of our invention may be employed instead of those explained, change being made as regards the materials or their amounts employed, provided the combination or compositions stated by any of the following claims or their equivalent be employed.

We, therefore, particularly point out and distinctly claim as our invention:

1. A compound having the formula

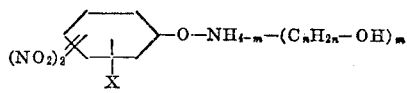

wherein X represents a member of the group consisting of the methyl radical and hydrogen, $n$ is an integer greater than 1, and $m$ is an integer from 1 to 3, inclusive.

2. A triethanol amine salt of 2.4-dinitro-phenol.

3. A triethanol amine salt of 2.4-dinitro-6-methyl-phenol.

4. A monoethanol amine salt of 2.4-dinitro-6-methyl-penol.

5. A parasiticidal composition comprising as toxic ingredients an oil and an alkanol amine salt of 2.4-dinitro-6-methyl-phenol having the formula

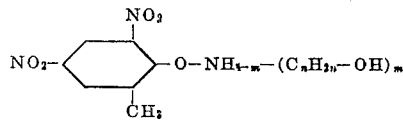

wherein $n$ is an integer greater than 1 and $m$ is an integer from 1 to 3, inclusive.

6. An ethanolamine salt of 2.4-dinitro-6-methylphenol having the formula

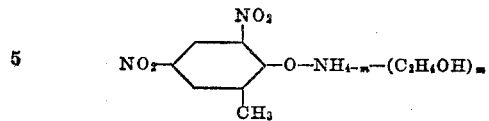

wherein $m$ is an integer from 1 to 3, inclusive.

7. An ethanolamine salt of 2.4-dinitrophenol having the formula

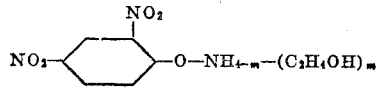

wherein $m$ is an integer from 1 to 3, inclusive.

8. A parasiticidal composition comprising as a toxic ingredient a compound having the formula:

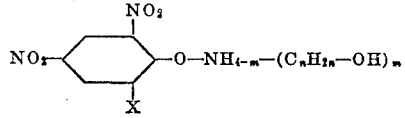

wherein X represents a member of the group consisting of the methyl radical and hydrogen, $n$ is an integer greater than 1, and $m$ is an integer from 1 to 3 inclusive.

FRANK B. SMITH.
JOHN N. HANSEN.